April 5, 1938.  P. E. L. BREUILH  2,112,823
APPARATUS FOR SORTING FRUIT AND OTHER ARTICLES ACCORDING TO THEIR WEIGHT
Filed May 20, 1937  3 Sheets-Sheet 1
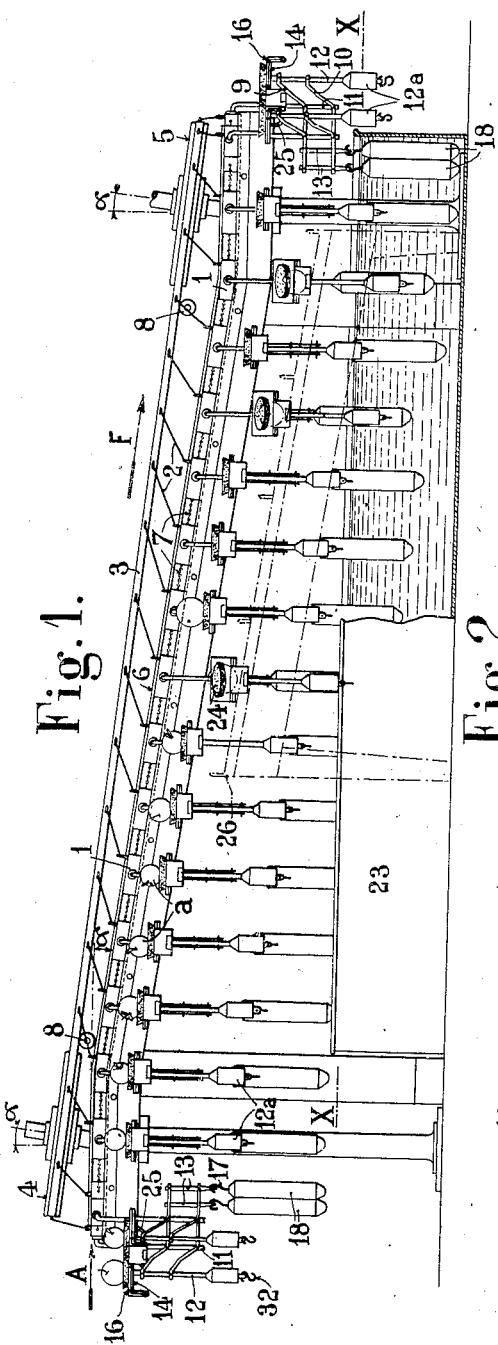
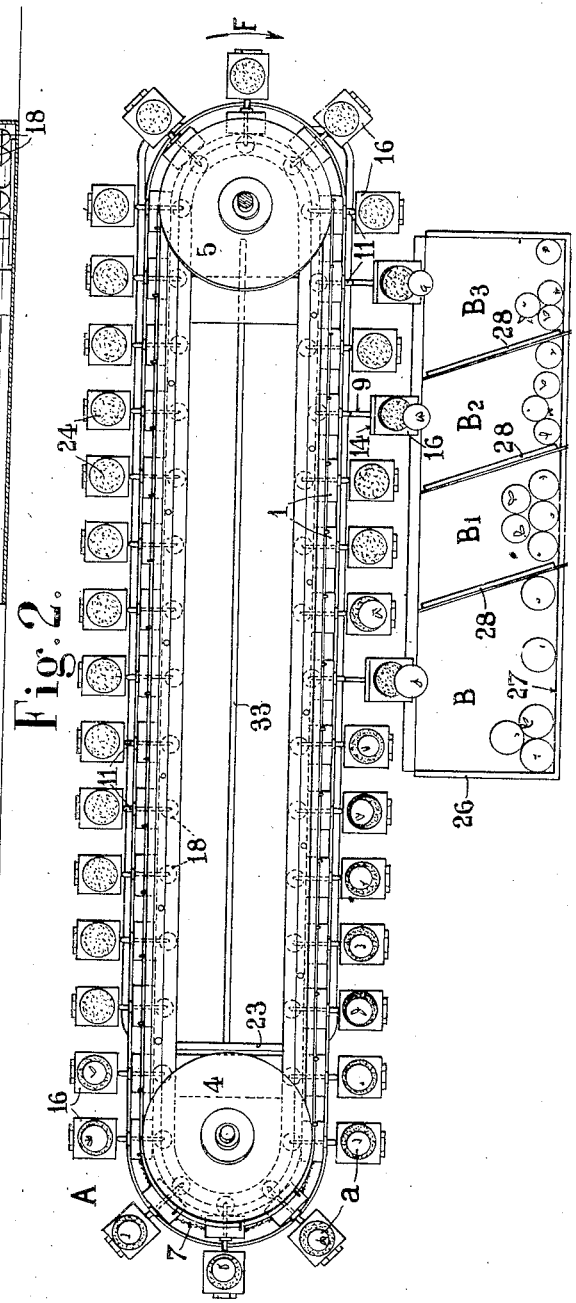
INVENTOR:
PIERRE EUSÉBE LUCIEN BREUILH
BY Haseltine, Lake & Co.
ATTORNEYS

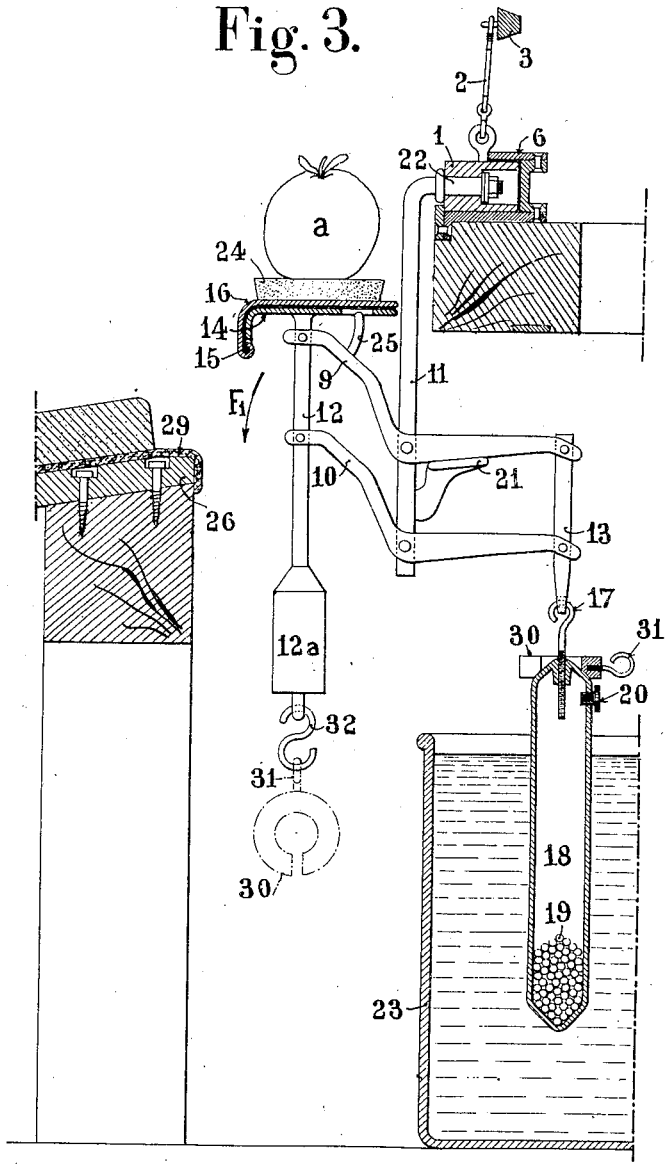

April 5, 1938.  P. E. L. BREUILH  2,112,823
APPARATUS FOR SORTING FRUIT AND OTHER ARTICLES ACCORDING TO THEIR WEIGHT
Filed May 20, 1937  3 Sheets-Sheet 3

INVENTOR:
PIERRE EUSÉBE LUCIEN BREUILH
BY Haseltine, Lake & Co.
ATTORNEYS

Patented Apr. 5, 1938

2,112,823

UNITED STATES PATENT OFFICE 2,112,823

APPARATUS FOR SORTING FRUIT AND OTHER ARTICLES ACCORDING TO THEIR WEIGHT

Pierre Eusebe Lucien Breuilh, Oran, Algeria

Application May 20, 1937, Serial No. 143,671
In France May 30, 1936

7 Claims. (Cl. 209—121)

The present invention relates to an apparatus for sorting according to their weight, various articles, for instance, fruit, early products, etc., by avoiding any cause of deterioration of these articles during their passage through the apparatus.

The latter comprises a series of scales or similar weighing devices, mounted on a conveying device which causes them to follow a closed cycle, to first pass in front of a leading station where the articles to be sorted are placed on by one on each plate of the scales which passes, then in front of a discharging and sorting station, by following an incline opposite which are arranged, one after the other, a plurality of receptacles or compartments receiving the articles which are automatically ejected from the scales at such or such point according to their weight.

For each scales this takes place at the time the weight of the article conveyed overcomes a progressively decreasing balancing stress which is opposed to it and then causes the scales to rock.

This balancing stress is produced, for instance, by means of a counterweight hung from the beam of the scales on the opposite side of the plate supporting the article to be sorted, and being progressively immersed, during the inclined portion of its path, in a liquid the free surface of which is maintained at a given level.

The scales are preferably arranged in such a manner as to rapidly rock as soon as their equilibrium is destroyed, in order that the articles they convey may be discharged just at the point of their path corresponding to their weight.

The conveyor can, for instance, be an ordinary belt or a belt having a trapezoidal cross section passing over two pulleys placed at two different levels and which, consequently, will have their axes inclined on the vertical to the desired angle.

The scales will be hung, for instance, from metal blocks in the shape of a parallelepipedon, drawn along, like small sledges, by the belt, on a track provided for them and throughout the length of which they are closely guided and held between suitable slides.

For that purpose, each sledge can carry an eye-bolt or a securing ring connected, by a metallic cord or the like, to another eye-bolt or ring riveted on the belt.

The track followed by these sledges and consequently by the scales therefore closely follows the conveying belt.

However, at its two ends which are two half-circumferences and opposite the loading station, this track is horizontal whilst the path followed by the belt is inclined as indicated. In front of the loading station it has the same inclination as the belt. The same is true for the return track. The flexibility of the attaching means ensures to the whole a regular operation without jerks, notwithstanding the slight variations of the distance separating the sledges from the belt.

A form of construction of an apparatus according to the present invention is diagrammatically illustrated by way of example only in the accompanying drawings.

Fig. 1 is a general elevation of this apparatus.

Fig. 2 is a plan view of the same.

Fig. 3 is a vertical section on an enlarged scale.

Figure 4:
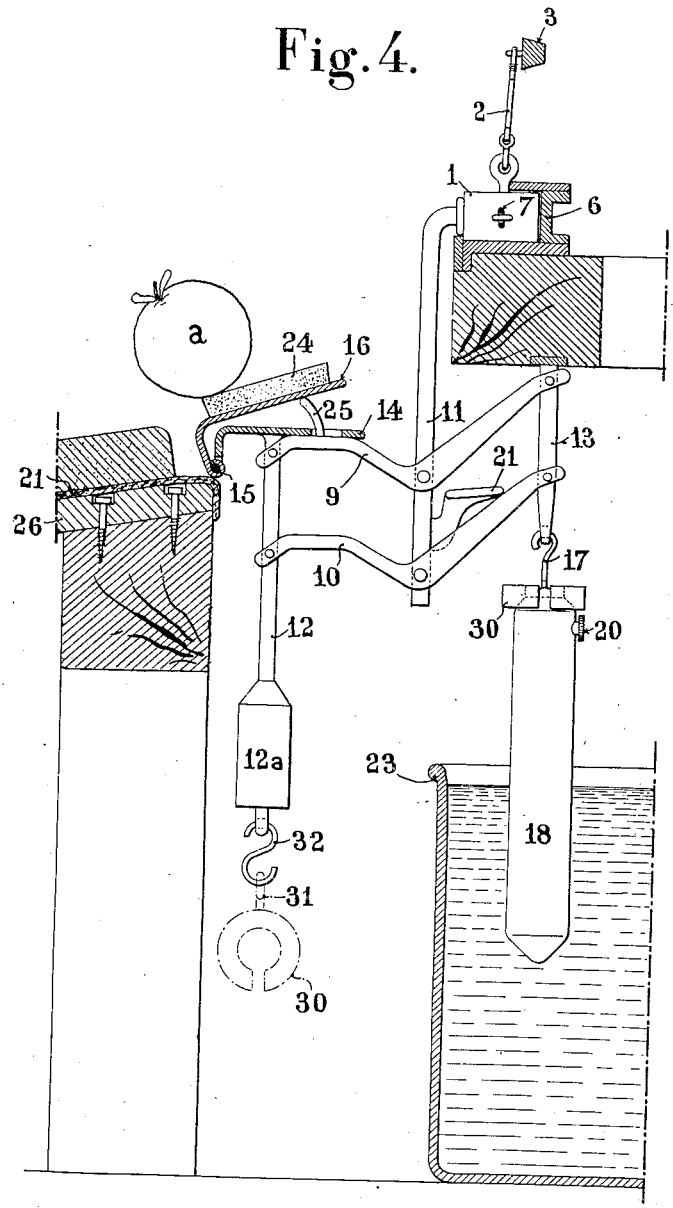
Fig. 4 is a similar section showing a scales in rocking position.

A series of similar scales are mounted on sledges or metal blocks 1 connected by metallic cords 2 to rings riveted at intervals on a belt having a trapezoidal cross section, passing over two grooved wheels 4 and 5 the axes of which have a certain inclination $\alpha$ on the vertical. The grooved wheels are thus placed at two different levels and the belt moves in a plane forming the same angle $\alpha$ with the horizontal plane. They are set in rotation by a suitable motor not shown.

Owing to the rotation of wheels 4 and 5 and to the actuation of the belt 3 the sledges 1 receive a continuous movement according to the arrow F. They are guided and held throughout their path by slides 6.

This path which is always in the vicinity of the belt 3 presents the following characteristic features. At both its ends, which are two half-circumferences, and opposite the loading station A, the guide slides are horizontal. On the contrary, in the rectilinear portion, reserved for the sorting, the slides, and consequently the path followed by the blocks 1, are inclined according to the angle $\alpha$ on the horizontal plane. The same is true for the return track. These arrangements ensure that the transverse axis of the sledge-blocks 1 is always in a horizontal position. Notwithstanding the variations which take place during the displacement, of the distance separating the track followed by the sledges 1 and the belt, the flexibility of the cords connecting them always ensures a pull without jerks and a uniform advance of the sledges 1 and of the scales they support. Finally the sledge-blocks 1 can be connected together by small unstretched chains 7 which have no other function than that of allowing a block to be drawn along by the block preceding it, in case the cord driving it along should accidentally fail.

For ensuring that the belt should satisfactorily fit in the grooves of the wheels, 4, 5, near the points where it enters the grooves, can be arranged two small supporting pulleys 8 which will guide it and support it at the required level.

Each scales comprises two similar beams 9 and 10 of angular shape, pivoted at their upper part on a vertical rod 11 and having their ends connected two by two by rods or links 12 and 13 also vertical, so as to form two parallel motions.

On one of these rods, 12, is rigidly secured a plate 14 on which is pivoted, by means of a hinge 15 at right angles to the plane of the beams, a shutter 16 adapted to support the articles to be sorted, for instance fruit $a$. The opposite rod 13 supports, by means of a hook 17 of adjustable length, a counterweight 18 having, for instance, the shape of a vertical hollow cylinder, closed at its ends and capable of being more or less weighted by lead shot 19 which is introduced through an opening normally closed by a plug or cap 20. Under the action of this counterweight subjected to the sole action of gravity, the scales assumes, when the shutter is empty or loaded with one of the articles to be sorted, even with the heaviest of the latter, the position shown in Fig. 3; the beam 9 is then pressed on a bracket 21 rigid with the rod 11. The latter is hung from one of the sledge blocks 1 by a pivot pin 22 passing through the sledge block 1 according to its transverse axis. The rod 11 is rigid with the pin 22 so that it will remain vertical even when it is subjected to an asymmetrical load.

Below the series of scales is placed a vat 23 containing water up to a predetermined level X—X such that the counterweights 18 are immersed therein during a portion of their displacement, as shown in Fig. 1.

The articles $a$ to be sorted are placed by hand either directly on the shutters 16, or on supports 24 secured to the latter, at the time the scales pass in front of the loading station A, that is to say, during the high portion of their path. These supports 24, which are light and relatively thick and made of cork for instance, are adapted to lift the fruit and, consequently, to promote the rapid ejection of the latter when the scales rock.

Owing to the displacement of the belt and of the blocks 1, each scales comes above the vat 23 and owing to the inclination of the slides, progressively lowers so that the counterweight 18 is gradually immersed in the water and is subjected to an increasing upward thrust equal to the weight of the volume of water it displaces. At a certain moment the equilibrium of the scales is thus destroyed and the beams 9, 10 rock in the direction of the arrow $F_1$.

This rocking movement is rendered sudden owing to the fact that, in the position of equilibrium, the beam arms located on the side of the counterweight 18 are horizontal, while those carrying the plate 14 are upwardly inclined; in fact, as soon as equilibrium is destroyed, the torque acting on the beams in the direction of the arrow $F_1$ about the suspension knife-edges and produced by the weight of the fruit $a$, support 24, shutter 16, plate 14, rod 13 and respective arms of the beams, gradually increases, whilst the torque of reverse direction, produced by the weight of the rod 13, respective arms of the beams and counterweight 18, less the upward thrust of the water on the latter, gradually decreases (provided the cross section of the counterweight is suitably determined).

In order to increase the suddenness of the rocking movement, for instance if flat articles are to be sorted or articles sliding with difficulty on the support 24, it is advantageous to provide the rod 12 with a downward extension and to weight it with a mass 12$a$ secured on said rod or formed in one piece with the latter. On the contrary, the shutter 16 and block 24 are as light as possible.

The rocking movement is limited by the fact that the plate 14 abuts against the beam 9 as shown in Fig. 4.

At the end of this rocking movement, the shutter 16 is upwardly struck by a finger 25 rigid with beam 9 and passing through an opening formed in plate 14. Consequently, the shutter pivots about the hinge 15 while rising. Owing to the fact that the shutter is in a high position relatively to its hinge, the article $a$ which it supports, is subjected, particularly if it is lifted by a support 24, to a lateral thrust which is added to the effect of the inclination for causing it to slide and fall into one of the receptacles B, $B_1$, $B_2$ ... adapted to receive the sorted articles and suitably arranged along the series of scales.

These receptacles are for instance constituted by a table 26 inclined both longitudinally and transversely and by longitudinal partitions 27 and transverse partitions 28, these partitions being preferably secured in such a manner that their positions and number can be changed according to the nature of the articles to be sorted, the number of categories in which it is desired to class them, etc. The walls of these receptacles will, if need be, be covered with a layer of soft or resilient material 29, for instance, sponge rubber, in order to avoid that the fruit, eggs or other fragile articles should be damaged by shocks.

It will be understood that the destruction of the equilibrium of the scales and consequently the fall of the articles will take place so much the farther in the direction of the arrow F as these articles are lighter, so that these articles are automatically sorted into the receptacles B, $B_1$, $B_2$, etc. ... by order of decreasing weights.

The apparatus must be capable of sorting articles of very different kinds. It is to be noted that the gravity of the counterweight must be function of the maximum weight of the article to be sorted, and that its volume must be function of the range of weights necessary for a satisfactory sorting.

When passing from the sorting of certain articles to the sorting of other articles differing from the first ones, either by the average weight, or by the range existing between the extreme weights, it might consequently be necessary, according to circumstances, either to replace the counterweights 18 by counterweights of the same kind, but having a different cross section, and consequently, of different volumes, or to increase or reduce the action of the counterweights by hanging from one or the other of the beams 9, 10, small additional weights 30 (Figs. 3 and 4) which are equal for all the scales.

These modifications can be very rapidly effected since the counterweights are simply hooked on the rods 11. As the weight of all these counterweights must be exactly adjusted, it is advantageous to provide the scales and respective counterweights with numbers or other reference marks, in order to avoid the necessity of beginning over again the adjustment of the weight each time the counterweights are changed.

Concerning the small additional weights 30, they will preferably have a shape allowing them to fit over the top of the counterweights 18 and will be provided with a hook 31 allowing on the contrary, to hang them from a hook 32 or ring carried by the pivot pin of the link 12 and of the beam 10.

For diminishing eddies, the vat 13 will be provided with a longitudinal partition 33 separating the ascending series of the counterweights from the descending series.

In the two half-circumferences which are travelled over by the scales, the centrifugal effect may cause disordinate movements of the counterweights; their swinging movement can be limited by means of a simple guide made of wire (not shown) approximately conforming to the shape of the path they must normally follow.

It is to be understood that, without departing from the scope of the present invention, the type of scales or weighing devices used may be changed, as well as their guide means and the devices adapted to cause them to fall or to eject the articles out of the scales into the receptacles B, B₁, B₂, etc. The use of a vat filled with liquid can even be avoided by utilizing any other suitable means for producing the desired progressive unloading effect in proportion as the scales move from the loading station to the receiving station. The conveying device, instead of being formed by a belt and sledges or carriages can be constructed in any other suitable manner, for instance, it can be constituted by an endless chain or by a circular inclined table pivoting about a fixed pivot pin at right angles to its plane and supporting the scales regularly distributed on its periphery; in this case, the vat would also be circular.

I claim:

1. An apparatus for sorting fruit and other articles according to their weight, comprising a series of scales, means for conveying all these scales according to an endless path a portion of which is downwardly inclined, a vessel containing a liquid located below this inclined portion of the path, each scales having, on one side, a plate adapted to receive one of the articles to be sorted and, on the opposite side, a counterweight so arranged as to be progressively immersed in said liquid when the scales follow the descending portion of said path, means for ejecting the article from the plate of each scales when the equilibrium of the latter is destroyed by the increasing thrust of the liquid on the respective counterweight, and means for receiving the articles thus ejected at different points of said inclined path of the scales.

2. An apparatus for sorting fruit and other articles according to their weight, comprising an endless conveyor a portion of the path of which is downwardly inclined, a vessel containing a liquid located below this conveyor, a series of scales driven by this conveyor and a plurality of fixed receptacles distributed along the path of the conveyor, each scales having, on one side, a plate adapted to receive the articles to be sorted, and, on the other side, a counterweight so arranged as to be progressively immersed in said liquid when the scales follow the descending portion of said path, and means for ejecting the article from the plate of each scales when the equilibrium of the latter is destroyed by the increasing thrust of the liquid on the respective counterweight.

3. An apparatus according to claim 1, in which the means for conveying the scales comprise two grooved wheels, an endless belt passing over these wheels, slides extending over a closed path which has rectilinear inclined portions and curved horizontal portions, sledges guided along these slides and connecting means between said belt and said sledges, each of these sledges supporting a scales.

4. An apparatus according to claim 1 in which each scales comprises a rod hung, as a pendulum, from the endless conveyor, two beams pivoted on this rod at two different levels, lateral rods pivoted on the ends of these beams, a plate secured to the top of one of these lateral rods, a shutter rockably mounted about a horizontal pin on this plate, and a counterweight hung under the other lateral rod.

5. An apparatus according to claim 1 in which each scales comprises a rod hung, as a pendulum, from the endless conveyor, two beams pivoted on this rod at two different levels, lateral rods pivoted on the ends of these beams, a plate secured to the top of one of these lateral rods, a shutter rockably mounted about a horizontal pin on this plate, and a counterweight hung under the other lateral rod said rod having a projection adapted to stop the oscillation of the beams in the direction of the preponderant action of the counterweight, and these beams being bent in such a manner that the pivots of the lateral rod carrying the plate are higher than the pivots of the opposite rod carrying the counterweight when the beams are thus stopped by said projection.

6. An apparatus according to claim 1 in which each scales comprises a rod hung, as a pendulum, from the endless conveyor, two beams pivoted on this rod at two different levels, lateral rods pivoted on the ends of these beams, a plate secured to the top of one of these lateral rods, a shutter rockably mounted about a horizontal pin on this plate, and a counterweight hung under the other lateral rod, one of said beams having an upwardly bent lateral finger adapted to push said shutter and cause it to rock about its hinge when the scales oscillates under the influence of the hydrostatic thrust of the liquid on the counterweight.

7. An apparatus according to claim 1, in which the means for receiving the ejected articles consist in a longitudinally and transversely inclined table having upwardly projecting ledges on its lower edge and on its sides, and partitions secured on this table in adjustable positions.

PIERRE EUSEBE LUCIEN BREUILH.